Jan. 29, 1946.  J. P. JOHNSON  2,393,690
ROTARY PUMP
Original Filed Aug. 14, 1940

INVENTOR.
JAMES P. JOHNSON
BY
ATTORNEY.

Patented Jan. 29, 1946

2,393,690

UNITED STATES PATENT OFFICE 2,393,690

ROTARY PUMP

James P. Johnson, Shaker Heights, Ohio

Original application August 14, 1940, Serial No. 352,558. Divided and this application April 22, 1941, Serial No. 389,785

5 Claims. (Cl. 230—207)

This invention relates to vacuum pumps of the rotary vane or blade type, especially adaptable for use on aircraft although not so restricted, and has for its primary object to provide an improved pump of this type which is simple and compact in construction, efficient in operation, and inexpensive to manufacture and assemble.

This application constitutes a division of my copending application Serial No. 352,558, filed August 14, 1940.

Another object of the present invention is to provide an improved oil metering means in which the quantity of oil required for best lubrication of the relatively movable parts may be predeterminately effected.

A still further object of the present invention is to embody the oiling mechanism and metering device in the mounting flange thus simplifying the construction and materially increasing the efficiency.

Another object of the present invention is to provide an oiling system capable of embodiment in many structures and it is not therefore to be in any manner restricted.

With the objects above indicated, and other objects hereinafter explained in view, my invention consists in the construction and combination of elements hereinafter described and claimed.

Referring to the drawing.

Figure 1:
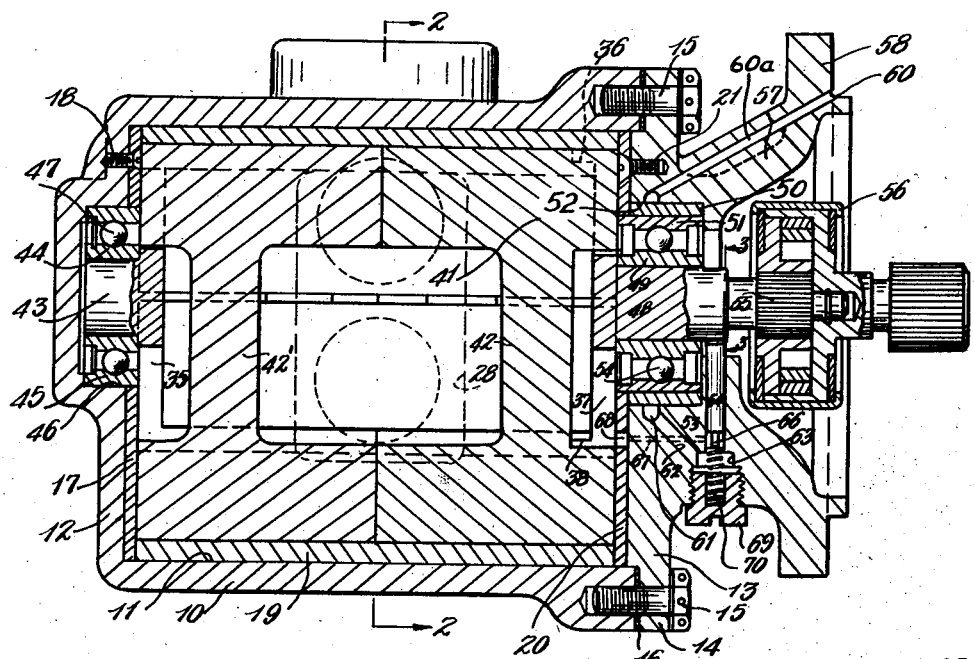
Figure 1 is a longitudinal vertical sectional view of a vacuum pump embodying the present invention.
Figure 3:
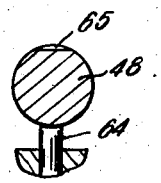
Figure 3 is a fragmentary transverse sectional view taken on line 3—3 in Figure 1 and showing the manner in which the oil metering plunger is reciprocated.

In the drawing I have illustrated the invention embodied in a vacuum pump especially adapted for use on aircraft but other adaptations will be obvious to those skilled in the particular art. The pump comprises a housing 10, of aluminum or other suitable light weight material, having a bore 11 extending inwardly from one end thereof terminating adjacent an outer integral end wall 12. The open end of the housing 10 is normally closed by a removable cover member 13 having a circular portion projecting into the open end for centrally positioning the cover member, the latter having a laterally extending circumferential flange 14 disposed in abutting relation with the outer adjacent face of the housing. A plurality of bolts 15 project through openings provided in the flange 14 and are threadably secured in aligned openings provided in the adjacent portion of the housing for removably securing the cover. A gasket 16 is disposed between the adjacent faces of the flange and housing to provide a fluid tight seal. A disc 17, of steel or other suitable material, is disposed at the inner end of the bore in abutting relation with the adjacent end wall 12 and is secured against displacement and relative rotation by a plurality of screws 18, the heads being bevelled and seated in countersunk openings in the disc to provide a smooth outer face. A sleeve 19, of steel or other suitable material, is disposed within the bore 11 and has its inner end in abutting relation with the adjacent face of the disc 17. A disc 20, of steel or other suitable material and similar to the disc 17, is disposed at the outer end of the sleeve 19 in abutment with the inner face of the cover member and secured, against displacement and relative rotation, to the latter by a plurality of screws 21, the heads of which are, likewise, bevelled and seated in countersunk openings in the disc to afford a smooth inner face.

The housing 10 is provided with an interiorly tapped opening 27 communicating at its lower end with a passageway 28 on one side of the sleeve 19 and an interiorly tapped opening 29 which communicates at its lower end with a passageway 30 disposed on the other side of the sleeve and opposite with respect to the passageway 28. The sleeve 19 is provided with a pair of openings 31 spaced apart relatively which extend transversely through one side thereof affording communication between the passageway 28 and the sleeve bore. The sleeve is also provided with a pair of openings 32 spaced apart relatively which extend transversely therethrough affording communication between the passageway 30 and the sleeve bore, the openings 31 and 32 being disposed in transverse alignment to afford simple production.

The rotor 33 is of improved construction to afford proper balancing which materially increases the efficiency of the pump and reduces wear. The rotor 33 comprises a cylindrical body portion 34, of steel or other suitable material, having an inner end wall 35 adapted for running engagement with the inner face of the disc 17. The outer end of the body portion 34 is provided with a longitudinal extension 36 of reduced diameter and a circular member 37, of steel or similar material, is disposed in abutment with the open end of the body portion functioning as an outer wall for closing the open end. The member 37 is provided with an inwardly extending marginal flange 38 in encircling relation about the reduced portion 36 and their faces are suitably welded, or otherwise secured, to provide a rigid unitary structure, the outer face of the member 37 having a running engagement with the inner face of the disc 20 as more clearly shown in Figure 1. The rotor 33 is eccentrically mounted within the bore 22 so as to have a close running engagement with the upper working face 28 of the bore between the openings 27 and 29, the axis of the rotor being disposed in the same transverse plane which passes through the radii centers effecting the faces of the bore.

Figure 2:
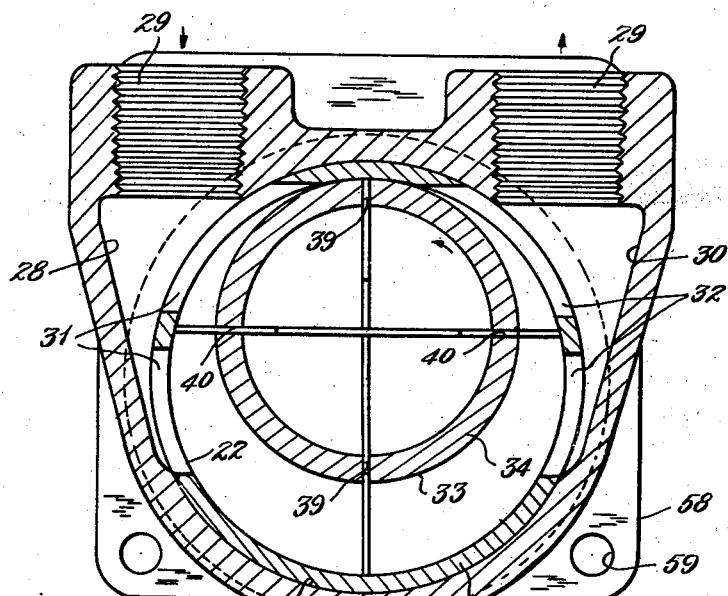
Figure 2 is a transverse sectional view taken on line 2—2 in Figure 1 and showing further details of the pump structure.

To effect a further balancing of the rotor a pair of through blades, of steel or other suitable material, are employed which embody novel structural and assembly features. The rotor 33 is provided with longitudinally extending slots 39 on diametrically opposite sides which are coextensive with the rotor body and end walls as more clearly shown in Figures 1 and 2. The rotor 33 is further provided with a pair of like longitudinally extending slots 40 on diametrically opposite sides which are co-extensive with the rotor body and end walls, the slots 39 and 40 being relatively spaced apart angularly, preferably at right angles, as shown in Figure 2. Through blades are slidably disposed in the respective pairs of slots 39 and 40 and each comprises a pair of identical half sections arranged in cooperative relation as more clearly shown in Figure 1. Inasmuch as the half sections of the through blades are of identical construction a detailed description of one section is believed to suffice and comprises a relatively flat thin substantially I-shaped section 41, the connecting web 42 of which is slightly offset from but substantially parallel with a vertical plane passing through the center of the flanges as viewed in Figure 1. By arranging two of such sections 41 with their flanges in longitudinal alignment and their inner sides in abutting relation and the connecting webs 42 nearer to the outer sides of the short flanges, one through blade is provided. The other through blade comprises a pair of sections similarly arranged but with their connecting webs 42' disposed inwardly of the connecting webs 42 on the first through blade, the outer sides of the longer flanges being in transverse alignment with the adjacent sides of the shorter flanges. The pair of through blades thus assembled are mounted within the respective pairs of slots 39 and 40 in the rotor and having their outer longitudinal edges in running engagement with the peripheral wall of the sleeve bore at diametrically opposite points while the outer sides of the blades are adapted for running engagement with the adjacent faces of the disc 17 and 20 respectively.

The rotor 33 is rotatably mounted anti-frictionally at its opposite ends in any suitable manner, such as shown in the drawing wherein an integral extension 43 is formed at its inner end and projects axially outwardly therefrom. The inner race 44 of a ball bearing assembly is securely mounted on the adjacent extension 43 and the outer race 45 is securely mounted in a bore 46 provided in the adjacent face of the wall. A plurality of balls 47 are disposed between the inner and outer races and secured in a well known manner. The outer end of the rotor 33 is also provided with an integral extension 48 projecting axially outwardly therefrom and the inner race 49 of a ball bearing assembly 50 is securely mounted thereon. The outer race 51 is securely mounted within an oil retaining sleeve 52 secured in a bore 53 formed on the inner adjacent side of the cover member 13. A plurality of balls 54 are disposed between the inner and outer races and secured in a well known manner. The outer end of the extension 48 is formed with a toothed pinion 55 adapted for connection with a flexible drive coupling 56, forming no part of the present invention but which may be like that disclosed in my prior Patent No. 2,356,322 dated August 22, 1944.

The cover member 13 has a rearwardly extending outwardly flared portion 57 integral with the flange 14 and terminates in a laterally extending mounted flange 58 having openings 59 so spaced as to adapt the flange for suitable mounting upon the engine pad.

While the vacuum pump is primarily employed for creating sufficient vacuum for the operation of flight instruments, the discharged air may be utilized in the operation of a de-icer or other similar instrumentality requiring a supply of air for its operation. The rotor operates at high speeds, usually around 3,000 R. P. M., if the discharged air is connected with a de-icer and test runs probably reach 5,000 R. P. M. Inasmuch as the pump handles air which has not lubricating qualities it is essential that the relatively movable parts of the pump be suitably lubricated and the quantity of lubricant should be controlled to supply just that required for best operating purposes because too much lubricant is, likewise, detrimental to the most efficient operation. Any suitable means may be employed for lubricating the relatively movable parts of the pump but one embodying novel features is shown in the drawing. The attaching flange 58 is provided with a plurality of openings 60 at its attaching face which are disposed angularly in different radial positions to adapt the flange for mounting on the engine pad in such a manner that one of the openings 60 will align with the oil passageway provided in the pad affording communication with the oil reservoir in the engine housing. These openings 60 are connected, by passageway 60a with an oil groove 61 provided in the cover member and encircling the sleeve 52 as more clearly shown in Figure 1. A passageway 62 is formed in the cover member and connects the oil groove 61 with a bore 63 formed at the lower end of the cover member. A plunger 64 is slidably mounted in an opening provided in the cover member and its outer end is adapted for engagement with the adjacent end of the extension 48 on the rotor. The outer end of the extension is provided with a flattened surface 65 adapted to contact the outer end of the plunger during rotation of the rotor for effecting reciprocation of the plunger. The lower end of the plunger is provided with a reduced end 66 the diameter of which with respect to the diameter of the opening in which it reciprocates controls the quantity of lubricant permitted to pass thereby from the inner end of the bore 63. An opening 67, of relatively small size, extends from the lower end of the plunger to the disc 20 which has an aligned opening 68 affording passage of the lubricant to the interior of the pump chamber. The outer end of the bore 63 is interiorly tapped to receive a screw threaded plug 69 for normally closing the same and a coiled spring 70 has its outer end disposed in a central bore provided in the plug and its inner end seated upon the lower end of the plunger for normally urging the plunger outwardly into contact with the adjacent end of the extension. Oil under pressure, of approximately fifty pounds, is supplied from the engine through one of the openings 60 where it passes to the oil groove 61. From there it passes through the passageway 62 to the bore 63 and upwardly around the reduced end 66 of the plunger. The rotor, of course, is rotating and as it does so the flattened face 65 engages the outer end of the plunger and rapidly reciprocates the same thus effecting a pumping action forcing the proper amount of lubricant through the opening 67 to the pump chamber. As previously stated, the quantity of oil is determined by the relative diameter of the lower end 66 of the plunger and the opening in which it reciprocates and this may be varied as desired. By having the plunger reciprocate any tendency for the passageways to clog up and thereby change the proper quantity of lubricant is eliminated.

In the operation of the pump it should be first pointed out that the construction is such that the pump may be operated in either direction without the necessity of changing any of the parts. With the rotor rotating in the counterclockwise direction as shown in Figure 2, the opening 27 becomes the inlet opening and is suitably connected to the vacuum actuated instruments in a well known manner. In this line, there should be the usual relief valve for maintaining the suction desired irrespective of flying conditions. The outlet opening 29 is suitably connected, as stated before, with a de-icer or is discharged to the slip stream and in this line there should be the usual safety valve and an oil separator for separating the oil from the air and the oil is returned through a suitable connection with the engine housing so that the oil is returned to the reservoir. As the rotor rotates suction is created at the inlet opening 27 and the air which is drawing in is forced around the chamber by the blades and discharged under pressure through the outlet opening. The amount of air discharged, of course, is dependent upon the speed of rotation of the rotor. By the use of equal diameters in forming the pump bore a greater displacement is provided than is possible with other types of bores now in common use. Due to the balanced condition of the rotor and blades, by their special construction and cooperative relation, vibrations are reduced to a negligible extent.

While I have described the preferred embodiment of the invention it is to be understood that I am not to be limited thereto inasmuch as changes and modifications may be resorted to without departing from the spirit of the invention as defined in the appended claims.

What is claimed is:

1. A lubricating means for rotary pumps of the type having a housing formed with a pump chamber and an eccentrically disposed rotor provided with sliding vanes contacting the pump chamber wall, the rotor having extensions projecting axially outwardly on diametrically opposite ends rotatably mounted in adjacent portions of the housing; a substantially continuous enclosed oil groove formed in said housing and disposed in encircling spaced relation with respect to one of said rotor extensions; a passageway in said housing affording communication between a source of oil under pressure and said groove; a plunger slidably mounted in a bore in said housing and having its inner end operatively engageable with an eccentric portion on the groove encircled rotor extension for effecting, through rotation of the latter, reciprocation of said plunger; resilient means operatively associated with said plunger for yieldably maintaining engagement between the cooperating portions of said plunger and extension; a second passageway in said housing affording communication between said oil groove and said bore at a point adjacent the outer end of said plunger; and a third passageway in said housing affording communication between said bore at a point inwardly of the outer end of said plunger and the interior of said pump chamber, the outer end of said plunger being provided with means in predeterminately spaced relation from the outer adjacent end of said third passageway to afford flow of lubricant in metered quantities through the latter passageway for lubricating the relatively movable parts of said rotor.

2. A lubricating means for rotary pumps of the type having a housing formed with a pump chamber and an eccentrically disposed rotor provided with sliding vanes contacting the pump chamber wall, the rotor having extensions projecting axially outward on diametrically opposite ends rotatably mounted in adjacent portions of the housing; a continuous enclosed oil groove formed in said housing and disposed in encircling spaced relation with respect to one of said rotor extensions; a passageway in said housing affording communication between a source of oil under pressure and said groove; a plunger slidably mounted in a bore in said housing and having its inner end operatively engageable with an eccentric portion on the groove encircled rotor extension for effecting, through rotation of the latter, reciprocation of said plunger; resilient means operatively associated with said plunger for yieldably maintaining engagement between the cooperating portions of said plunger and extension; a second passageway in said housing affording communication between said oil groove and said bore adjacent the outer end of said plunger; and a third passageway in said housing affording communication between said bore at a point inwardly of the outer end of said plunger and the interior of said pump chamber, the outer end of said plunger being provided with a portion of reduced diameter in predeterminately spaced relation from the outer adjacent end of said third passageway to afford flow of lubricant in metered quantities through the latter passageway for lubricating the relatively movable parts of said rotor.

3. A lubricating means for rotary pumps of the type having a housing formed with a pump chamber and an eccentrically disposed rotor provided with sliding vanes contacting the pump chamber wall, the rotor having extensions projecting axially outward on diametrically opposite ends rotatably mounted in adjacent portions of the housing; a continuous enclosed oil groove formed in said housing and disposed in encircling spaced relation with respect to one of said rotor extensions; a passageway in said housing affording communication between a source of oil under pressure and said groove; a plunger slidably mounted in a bore in said housing and having its inner end operatively engageable with an eccentric portion on said groove encircled rotor extension for effecting, through rotation of the latter, reciprocation of said plunger; resilient means mounted in said housing and operatively associated with the outer end of said plunger for yieldably maintaining the inner end in engagement with said rotor extension; a second passageway in said housing affording communication between said oil groove and said bore adjacent the outer end of said plunger; and a third passageway in said housing affording communication between said bore at a point inwardly of the outer end of said plunger and the interior of said pump chamber, the outer end of said plunger being provided with a portion of reduced diameter in predeterminately spaced relation from the outer adjacent end of said third passageway to afford flow of lubricant in metered quantities through the latter passageway for lubricating the relatively movable parts of said rotor.

4. A lubricating means for rotary pumps of the type having a housing formed with a pump chamber and an eccentrically disposed rotor provided with sliding vanes contacting the pump chamber wall, the rotor having extensions projecting axially outward on diametrically opposite ends rotatably mounted in adjacent portions of the housing; a continuous enclosed oil groove formed in said housing and disposed in encircling spaced relation with respect to one of said rotor extensions; a passageway in said housing affording communication between a source of oil under pressure and said groove; a plunger slidably mounted in a bore in said housing and having its inner end operatively engageable with the groove encircled rotor extension, said extension having a flattened face cooperatively engageable with the adjacent end of said plunger for effecting, through rotation of the latter extension, reciprocation of said plunger; resilient means mounted in said housing and operatively associated with the outer end of said plunger for yieldably maintaining the inner end in engagement with said rotor extension; a second passageway in said housing affording communication between said oil groove and said bore adjacent the outer end of said plunger; and a third passageway in said housing affording communication between said bore at a point inwardly of the outer end of said plunger and the interior of said pump chamber, the outer end of said plunger being provided with a portion of reduced diameter in predeterminately spaced relation from the outer adjacent end of said third passageway to afford flow of lubricant in metered quantities through the latter passageway for lubricating the relatively movable parts of said rotor.

5. A lubricating means for rotary pumps of the type having a housing formed with a pump chamber closed at one end by a detachable cover member and an eccentrically disposed rotor provided with sliding vanes contacting the pump chamber wall, the rotor having extensions projecting axially outward on diametrically opposite ends rotatably mounted in adjacent portions of the housing and cover member respectively, said cover member being provided with a transverse opening the surrounding wall of which is provided with a continuous oil groove disposed in encircling spaced relation with respect to one of said rotor extensions; a sleeve secured in said transverse opening and adapted to close the adjacent side of said groove; a passageway in said cover member affording communication between a source of oil under pressure and said groove; a plunger slidably mounted in a bore in said cover member and having its inner end operatively engageable with an eccentric portion on the groove encircled rotor extension, for effecting, through rotation of the latter, reciprocation of said plunger; resilient means mounted in said cover member and operatively associated with the outer end of said plunger for yieldably maintaining the inner end in engagement with said rotor extension; a second passageway in said cover member affording communication between said oil groove and said bore adjacent the outer end of said plunger; and a third passageway in said cover member affording communication between said bore at a point inwardly of the outer end of said plunger and the interior of said pump chamber, the outer end of said plunger being provided with a portion of reduced diameter in predeterminately spaced relation from the outer adjacent end of said third passageway to afford flow of lubricant in metered quantities through the latter passageway for lubricating the relatively movable parts of said rotor.

JAMES P. JOHNSON.